United States Patent [19]

Genuit et al.

[11] 4,442,343

[45] Apr. 10, 1984

[54] ADJUSTABLE CUP AND FLUID HEATER

[75] Inventors: James E. Genuit, Carrollton; Gary Cooper, Lewisville, both of Tex.

[73] Assignee: Koffee Keeper, Inc., Lewisville, Tex.

[21] Appl. No.: 369,101

[22] Filed: Apr. 16, 1982

[51] Int. Cl.³ ............................................. F27D 11/02
[52] U.S. Cl. ....................................... 219/433; 99/374;
219/328; 219/386; 219/432; 219/442; 219/449;
219/472; 219/494; 219/505; 219/510; 219/521;
126/374
[58] Field of Search ............... 219/328, 242, 386, 387,
219/430, 432, 328, 281, 433, 434, 435, 439, 441,
449, 494, 510, 499, 521, 511, 472, 473, 474, 475,
476, 477, 478; 99/374; 126/126, 344, 374, 376

[56] References Cited

U.S. PATENT DOCUMENTS

| | | | |
|---|---|---|---|
| 1,990,640 | 2/1935 | Doherty | 219/449 |
| 2,148,742 | 2/1939 | Graham | 219/433 X |
| 2,492,865 | 12/1949 | Huenergardt | 219/433 |
| 2,611,851 | 9/1952 | Lott | 219/387 |
| 2,634,359 | 4/1953 | Terry | 219/449 X |
| 2,687,469 | 8/1954 | Koci | 219/433 X |
| 2,702,336 | 2/1955 | Wagner et al. | 219/433 |
| 2,727,129 | 12/1955 | Davis, Jr. | 219/511 |
| 2,740,879 | 4/1956 | Bieling et al. | 219/449 |
| 3,488,473 | 1/1970 | Sanders | 219/281 |
| 3,524,968 | 8/1970 | Walsh | 219/499 |
| 3,681,568 | 8/1972 | Schaefer | 219/432 |
| 3,769,495 | 10/1973 | Orfei | 219/433 |
| 3,902,043 | 8/1975 | Rogan | 219/242 |
| 4,096,376 | 6/1978 | Macklem | 219/328 |
| 4,158,126 | 6/1979 | Seitz | 219/439 |
| 4,188,864 | 2/1980 | Fischer | 219/433 X |
| 4,253,013 | 2/1981 | Mabuchi | 219/521 |

Primary Examiner—Volodymyr Y. Mayewsky
Attorney, Agent, or Firm—Stoll, Stoll & Hoffman

[57] ABSTRACT

A heater for cups and fluids therein having an adjustable heat selector, heating circuitry and temperature stabilization circuitry, comprising a base support, an electrical circuit enclosing housing, an opening in an upper substantially horizontal surface of the housing for a heating element plate and heat sensor, and an upright section of the housing enclosing additional circuitry having a vertical, substantially cylindrical surface facing the heating element plate, substantially rectangular vertical surfaces for the remaining three sides of the upright section, the vertical substantially cylindrical surface and the substantially rectangular vertical surfaces forming an open-topped receptacle having inner partitions and a closed bottom for receiving assorted personal articles. The circuitry comprises a heat element, a solid-state controlled switch, a power supply, a temperature sensor, an adjustable temperature control and an integrated circuit having the basic functions of limiter, power supply, detector, sensing amplifier, gate and protection features.

1 Claim, 3 Drawing Figures

ADJUSTABLE CUP AND FLUID HEATER

BACKGROUND OF THE INVENTION

Various heating devices are known to the art of which the following patents are specifically known to the applications, none of which provide the specific features of the present invention: U.S. Pat. Nos. 1,990,640, Doherty; 2,492,865, Huenergardt; 2,687,469, Koci; 2,727,129, Davis, Jr.; 2,740,879, Bieling et al; 3,488,473, Sanders; 3,524,968, Walsh; 3,681,568, Schaefer; 4,096,376, Macklem.

SUMMARY OF THE INVENTION

The present invention fills a formerly unsolved need for a heating system for personal use, capable of maintaining a single beverage cup at a selectable, closely controlled temperature over prolonged time periods.

Accordingly it is an object of the present invention to provide in a compact configuration a heater for a single beverage cup having electrical circuit features capable of providing adjustable temperatures which, once selected, will be maintained within a small tolerance, and a housing accomodating the circuitry, controls, heating element, cup and assorted personal articles.

It is a further object of the present invention to provide an individual with a personal cup heater capable of maintaining within 3° a temperature selected by the individual for the contents of the cup while at the same time providing a receptacle for holding various personal articles such as writing implements, paper clips and the like.

DESCRIPTION OF A PREFERRED EMBODIMENT OF THE INVENTION

Figure 1:
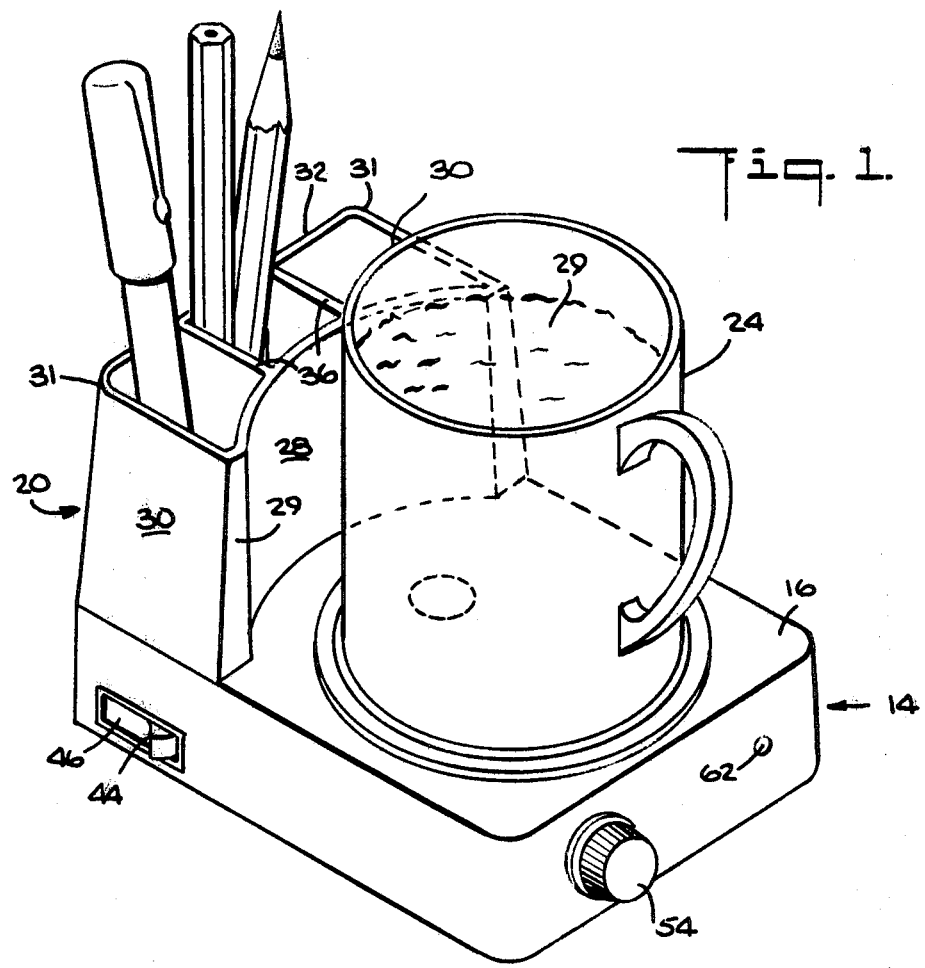
FIG. 1 is a perspective view of the adjustable cup and fluid heater of the present invention with a cup in place and assorted articles therein.
Figure 2:
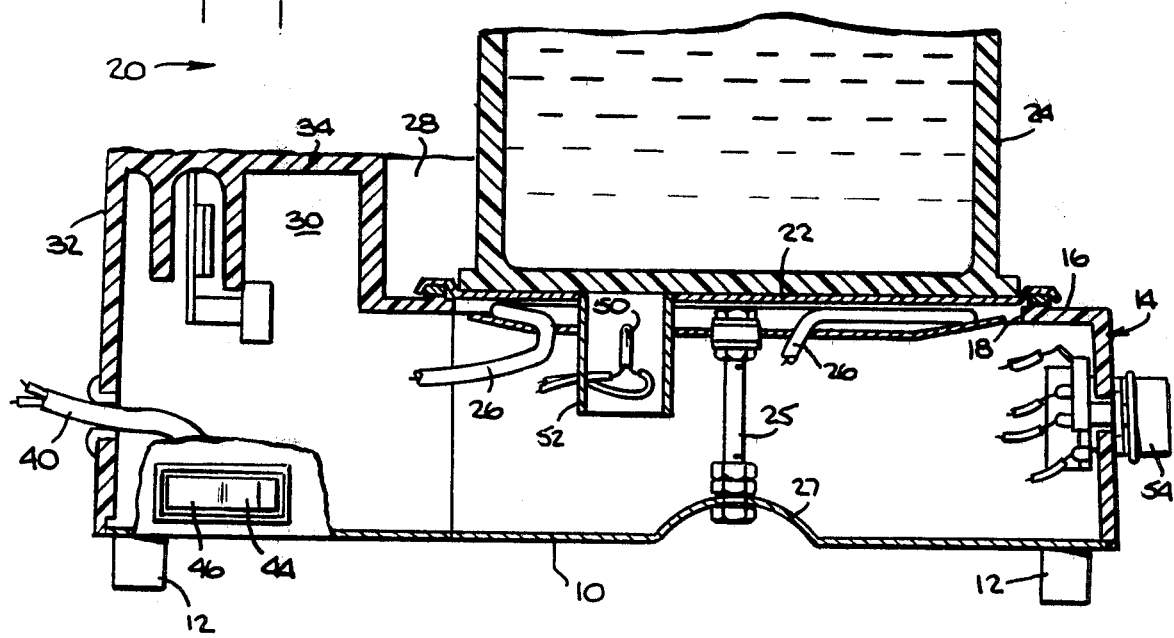
FIG. 2 is a partial cross-sectional view taken through the base support, housing and cup, and showing the placement of some of the electrical elements therein of the present invention.

Referring to the drawing, base 10, supported on non-slip feet 12, in turn supports a housing 14 having a substantially horizontal surface 16 with a circular opening 18 defined therein and a vertically upwardly extending portion 20. Housing 14 is made of suitable heat resisting dielectric plastic which may be easily cleaned and is of pleasing appearance. Mounted in circular opening 18 is a heating plate 22 made of a suitable heat-transmitting material, such as sheet metal, which is able to support a beverage cup 24 from above and transmit heat from a heating element 26 below. To adequately hold a full cup, heating plate 22 is supported on base 10 by bolt 25, the base having a raised recess 27 for the purpose.

Vertically extending portion 20 comprises a substantially vertical front wall 28 which is concave and, in the preferred embodiment, substantially cylindrical. Front wall 28 faces heating plate 22 and curves partially around cup 24 providing, if necessary, a backstop for cup 24 when it is carelessly or roughly placed on housing 14. Extending rearwardly from opposite side edges 29 of front wall 28 are a pair of oppositely disposed substantially parallel side walls 30 which are in turn joined by rear wall 32 at radiused rear edges 31. Vertically extending portion 20 is therefore formed of front wall 28, rear wall 32 and side walls 30 to form an open-topped receptacle to receive and hold in a convenient manner such assorted articles as writing implements and the like. To prevent such articles from extending into the interior of housing 14, vertically extending portion is further provided with a floor 34 at, or in the preferred embodiment above, the level of horizontal surface 16. Vertically extending portion 20 may additionally be provided with at least one interior divider 36; in the preferred embodiment there are a plurality of dividers 36 which extend in parallel relationship from front wall 28 to rear wall 32.

Figure 3:
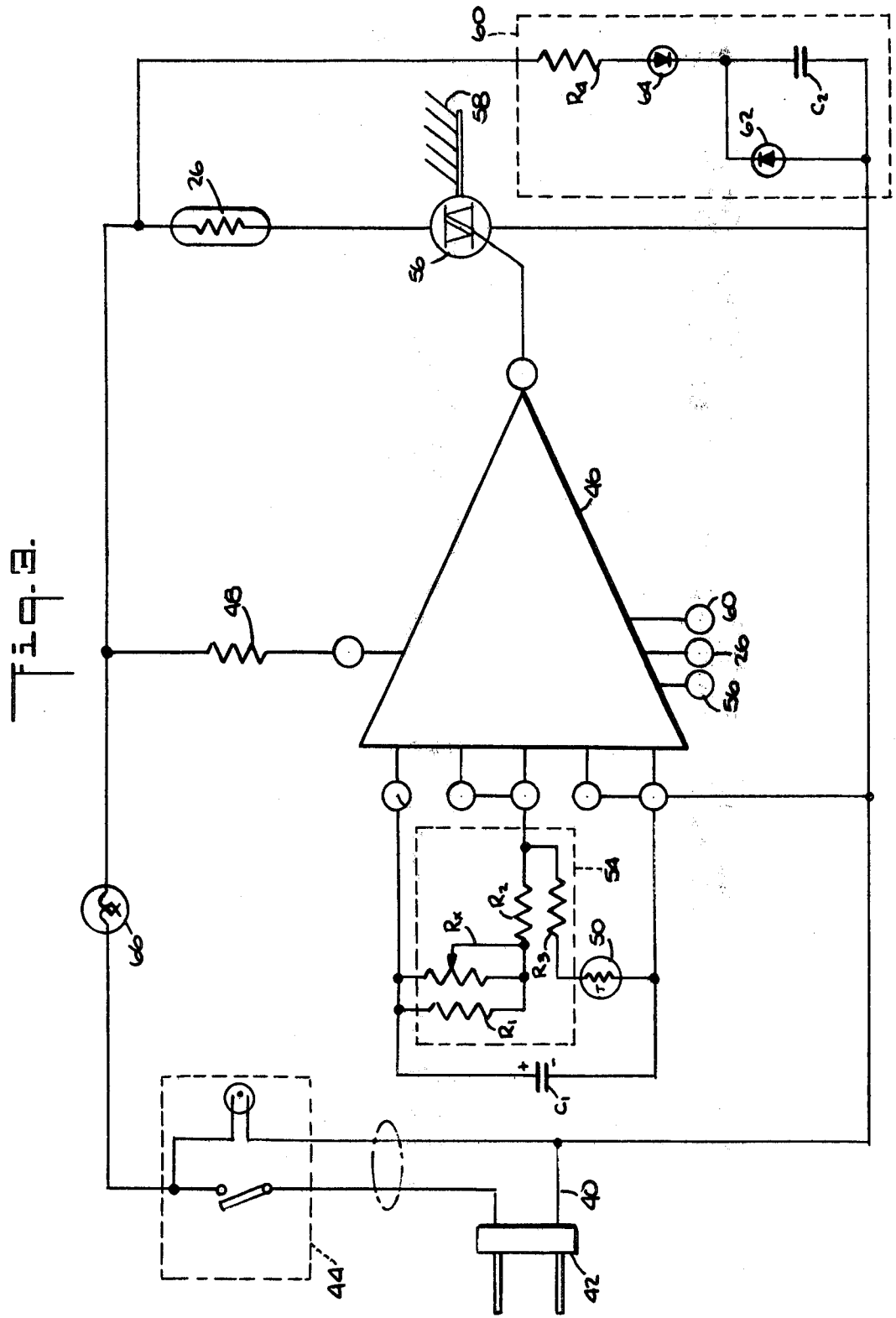
FIG. 3 is a schematic diagram of the electrical circuit of the present invention.

The electrical circuitry of the present invention comprises a power line 40 having a polarized live plug 42, an on-off power switch 44 with which is associated a neon lamp 46 to indicate when the unit is turned on. Neon lamp 46 may be part of power switch 44, as schematically indicated in FIG. 3, or if power switch 44 is mounted on the side of the housing 14, then neon lamp 46 may be placed elsewhere on housing 14 for visibility. Lamp 46 may, of course, be incandescent or a light-emitting diode.

An integrated circuit 46 is connected to power line 40 and comprises a limiter, which functions to reduce the conventional AC line power to a DC power supply for IC 46, a zero crossing detector to provide switching to external circuit to reduce electromagnetic interference, a sensing amplifier on/off which is necessary to produce a signal to control the gate circuit and turn it on or off, triac output gate, controlled as indicated, to drive an external solid state switch on or off, a protection circuit to prevent gating of the triac gate if excessive current or no current flows in the sensor, and an inhibit circuit which may be provided as a limit switch. IC 46 may be, for example, an RCA CA3059 chip and is basically a zero voltage switch. IC 46 is provided with a dropping resistor 48 which may be a 10K ohm 2W resistor.

A heat sensor 50, which may be a thermistor or base emitter junction of an NPN silicon transistor, is located in a sealed well 52 in heating plate 22, samples heat of cup 24 and converts it into a current fed into the sensing amplifier of IC 46. An adjustable temperature control 54 controls IC 46 and is comprised of a look variable resistor Rx and resistors R1 (33K, 1/4W), R2 (3.9K, 1/4W) and R3 (2.2K, 1/4W) as shown in FIG. 3., the given values of which provide the preferred temperature range of 120° F. to 180° F. for maximum usefullness with conventional not beverages such as coffee or tea. A power supply filter C1 is also provided with preferred values of 100 uf @ 15 v.

Heating element 26 may be a 50W film, rope or calrod type and is connected to a triac thyristor 56 which, as an electronic solid state controlled switch is used to control the main AC power through heating element 26. An RCA T23060 thyristor may be used and is mounted on a heat sink 58. Activated by heating element 26 is an indicating circuit 60 comprising a light emitting diode 62, an AC voltage dropping resistor R4 (12K, 1W), an AC to DC rectifier 64 and a DC filter C2 (6 uf @ 10 v). Lastly, a micro-temperature sensing safety switch 66 may be provided in line with heating element 26 to provide a safety shut-off for maximum temperature (169° C. is preferred) or for excess current flow.

While the foregoing is illustrative of a preferred embodiment, other embodiments may be had within the teachings hereof.

What is claimed is:

1. A heater for cups and fluids therein, comprising:
   a. adjustable heating circuitry means, said adjustable heating circuitry comprising a heating element and a solid-state controlled switch, AC power supply, temperature sensor; adjustable temperature control and circuit and combined limiter, DC power supply, detector, sensing amplifier and gate and protection integrated circuitry in operative circuit therewith,
   b. a base support,
   c. a heating plate, said heating plate being disposed above said heating element and being comprised of heat-conductive material,
   d. circuit-enclosing housing means, said circuit-enclosing housing means being supported by said base support and comprising a substantially horizontal surface defining an opening for mounting said heating plate therein and vertically-extending receptacle means, said vertically-extending receptacle means comprising a floor and front, rear and a pair of opposed side walls defining an open topped receptacle said front wall facing said heating element being concave about at least a portion of said heating plate, said floor being disposed at a level which is above the level of said horizontal surface,
   f. said base support comprising a recess raised in an upwardly extending direction toward, and located substantially beneath, said heating element and said heating plate,
   g. heating support means, said heating support means extending between said recess, said heating element and said heating plate and comprising a bolt,
   h. said circuit-enclosing housing means being comprised of an electrically non-conductive material,
   i. said solid-state controlled switch and said adjustable temperature control each being accessably located on an exposed portion of said circuit-enclosing housing means,
   j. a sealed well, said sealed well being located in said heating plate,
   k. said temperature sensor being located in said sealed well in thermal communication with a cup placed on said heating plate.

* * * * *